(12) United States Patent
Kapur et al.

(10) Patent No.: US 7,580,926 B2
(45) Date of Patent: Aug. 25, 2009

(54) METHOD AND APPARATUS FOR REPRESENTING TEXT USING SEARCH ENGINE, DOCUMENT COLLECTION, AND HIERARCHAL TAXONOMY

(75) Inventors: Shyam Kapur, Sunnyvale, CA (US); Ayman O. Farahat, San Francisco, CA (US); Richard E. Chatwin, Sunnyvale, CA (US)

(73) Assignee: Adchemy, Inc., Redwood City, CA (US)

( * ) Notice: Subject to any disclaimer, the term of this patent is extended or adjusted under 35 U.S.C. 154(b) by 261 days.

(21) Appl. No.: 11/607,191

(22) Filed: Dec. 1, 2006

(65) Prior Publication Data

US 2007/0136256 A1    Jun. 14, 2007

Related U.S. Application Data

(60) Provisional application No. 60/742,023, filed on Dec. 1, 2005.

(51) Int. Cl.
  *G06F 17/30*   (2006.01)
  *G06F 7/00*   (2006.01)
(52) U.S. Cl. ........................................ 707/3
(58) Field of Classification Search ...................... 707/3
  See application file for complete search history.

(56) References Cited

U.S. PATENT DOCUMENTS

| 6,122,647 | A * | 9/2000 | Horowitz et al. ............ 715/205 |
| 6,360,227 | B1 * | 3/2002 | Aggarwal et al. ........... 707/102 |
| 6,922,699 | B2 | 7/2005 | Schuetze |
| 7,426,507 | B1 * | 9/2008 | Patterson ......................... 707/3 |
| 2002/0169770 | A1 * | 11/2002 | Kim et al. ........................ 707/5 |
| 2004/0034633 | A1 * | 2/2004 | Rickard ........................... 707/5 |
| 2005/0049999 | A1 * | 3/2005 | Birn et al. ........................ 707/1 |
| 2005/0114370 | A1 | 5/2005 | Lewak |

OTHER PUBLICATIONS

PCT/US06/45984, Communication in Cases for Which No Other Form is Applicable, ISA/US Commissioner for Patents, P.O. Box 1450, Alexandria, Virginia 22313-1450, Mar. 25, 2009.
PCT/US2006/045984, Notification Concerning Transmittal of Copy of International Preliminary Report on Patentability and Written Opinion of the ISA, (Chapter I of the Patent Cooperation Treaty), The International Bureau of WIPO 34, chemin des Colombettes 1211 Geneva 20, Switzerland, Apr. 7, 2009.

* cited by examiner

*Primary Examiner*—Pierre M Vital
*Assistant Examiner*—Sabana Rahman
(74) *Attorney, Agent, or Firm*—Baker Botts L.L.P.

(57) ABSTRACT

Embodiments of a data representation system for describing specific data sets, such as documents, web pages, or search engine queries, based on data tokens, such as words or n-grams, contained in a collection of documents are described. Such a system can be used in any type of information retrieval application, such as a document, web page, or online advertisement serving process, based on an information request, such as a query executed through an Internet search engine. For example, when a search is performed at a search engine, a content provider uses the system to represent the search query and compares the query representation against representations of a set of content in order to identify, retrieve and aggregate the content from the set most relevant to the search query, in the form of a web page or other data unit for display or access through the web browser.

36 Claims, 11 Drawing Sheets

METHOD AND APPARATUS FOR REPRESENTING TEXT USING SEARCH ENGINE, DOCUMENT COLLECTION, AND HIERARCHAL TAXONOMY

CROSS-REFERENCE TO RELATED APPLICATIONS

The current application claims the benefit under 35 U.S.C. § 119(e) of Provisional Application No. 60/742,023, entitled "Selecting an Advertisement Corresponding to a Search Engine Query," and filed on Dec. 1, 2005.

FIELD

Embodiments of the invention relate generally to information systems, and more specifically to obtaining representations of data sets, such as for identifying relevant messages to be displayed on a web browser in response to queries input to an Internet search engine.

BACKGROUND

The widespread use of the Internet has led to the establishment of search engine environments as the virtually standard way in which users interface to the World Wide Web and retrieve content and access web and other network sites. Search engines such as Google™, Yahoo™, allow users to enter a term or phrase of interest (a "search term"), and then return the URL (Uniform Resource Locator) addresses of web sites that pertain to the or other information regarding the search term. Search engine functionality is also incorporated in many applications that serve as portals or interfaces to the Internet in general, or specific web sites for organizations or individuals.

As the numbers of Internet users and information providers increase, search engines sites have become increasingly specialized to provide greater focus and comprehensive search capability on specific subjects. Instead of general search engines that provide general search capability for virtually all possible topics, specialized search engines have been developed for specific fields and topics of interest. For example, music or movie sites allow users to download entertainment content, social networking sites allow users to share personal information or search for dates, job sites allow users to look for jobs, retail or auction sites allow users to search for products, and so on.

Despite the increasing specialization of web sites and general content on the Internet, search engine methodology remains relatively rudimentary. In general, present methods of finding and retrieving data for search engine users attempt to match the entire query string or a portion of the query string to a list of terms in the database, and choose content that is associated with a matched term. Such methods typically only perform a simple keyword matching operation to find content based on the query string. In many cases, there are no matches found between the entire query string and the list of terms. In other cases, the returned content does not fit the actual search query as optimally as possible due to the use of simplistic keyword matching algorithms.

Present methods of finding content through search engine activity typically do not utilize the search results themselves. They are limited to using the input queries only, and therefore do not take advantage of much of the relevant information that may be available to tailor a message search. Present search techniques also do not exploit general subject matter indicators that may be present in a query or set of search results. As a result, they are unable to expand the scope of searched documents to include relevant documents that may not actually create a keyword hit.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a data representation system for describing specific data sets, such as documents, web pages, or search engine queries, based on data tokens, such as words or n-grams, contained in a collection of documents are described. Such a system can be used in any type of information retrieval application, such as a document, web page, or online advertisement serving process, based on an information request, such as a query executed through an Internet search engine. For example, when a search is performed at a search engine, a content provider uses the system to represent the search query and compares the query representation against representations of a set of content in order to identify, retrieve and aggregate the content from the set most relevant to the search query, in the form of a web page or other data unit for display or access through the web browser.

In the following description, numerous specific details are introduced to provide a thorough understanding of, and enabling description for, embodiments of the data representation and content serving method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Vector Representation

Figure 1:
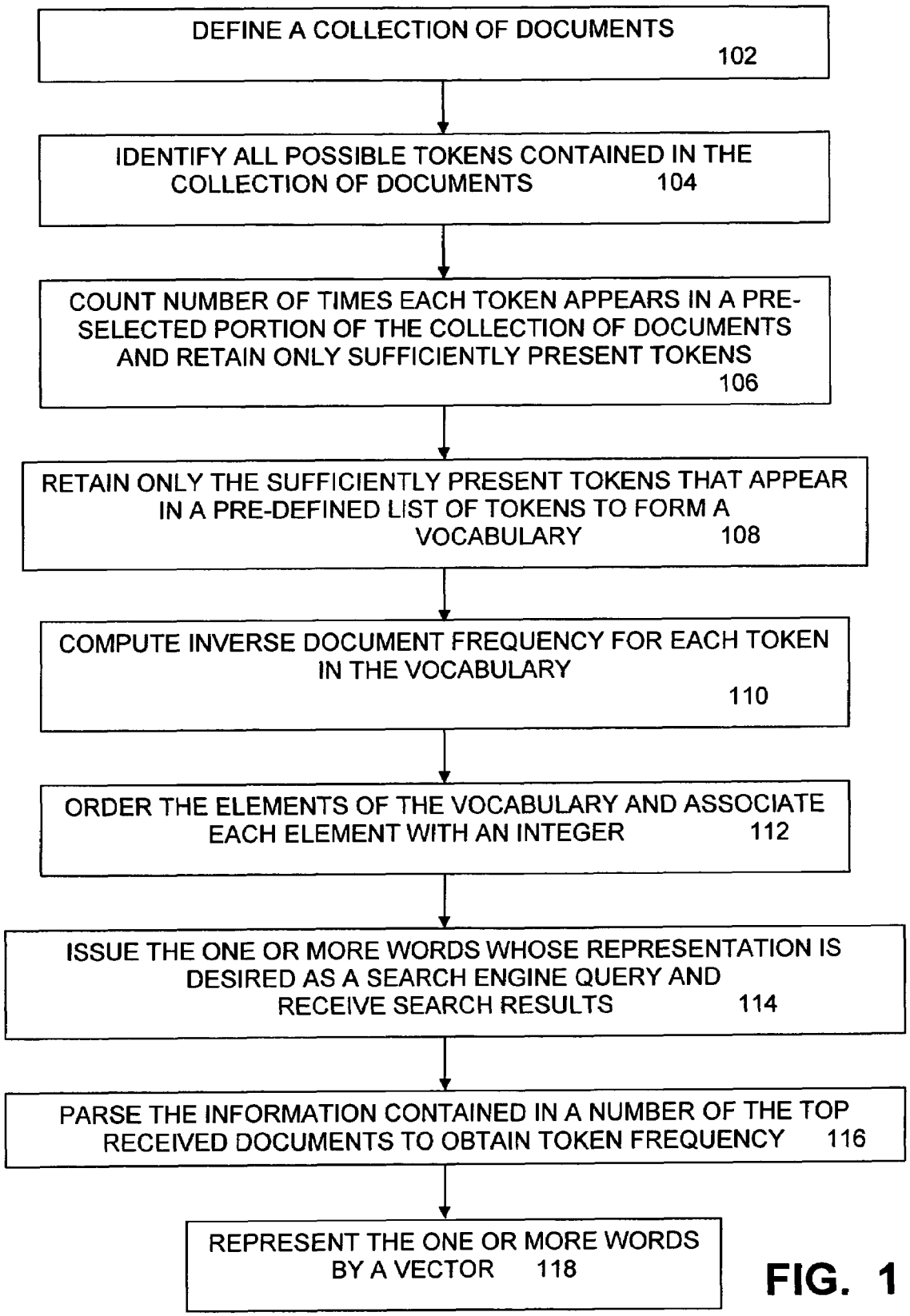
FIG. 1 is a flowchart that illustrates a generalized method of obtaining vector representations of one or more words from a collection of documents, under an embodiment.

FIG. 1 is a flowchart that illustrates a generalized method of obtaining a vector representation of one or more words (hereafter "keyword") from a collection of documents, under an embodiment. Such a method could be performed by a process executed on a computer. In block 102, a particular collection of one or more documents is defined. Within this collection of documents, all possible tokens are identified, block 104. In general, a token is an n-gram of length n=1, . . . , m that appears anywhere in the document collection. The integer m defines the maximum word length of any token, thereby limiting the total number of tokens derived from the document collection. In one embodiment, the n words of an n-gram must appear in order and consecutively in one or more locations within the document collection for the n-gram to define a token. In another embodiment, all stop words (words that are deemed not helpful in determining the significance or relevance of data items) are removed from the document collection before the presence or absence of n-grams is established.

In one embodiment, the token may correspond to an n-gram that appears within one or more queries input to a search engine. Thus, in this embodiment the document collection is a log of queries input to a search engine and a token is an ordered set of words (of length m words or less) that appear consecutively within any query appearing in the query log. In another embodiment, the token may correspond to an n-gram that appears within one or more catalogs of programs and courses published by online education institutions, or similar entities. Thus, in this embodiment the document collection is the set of catalogs and a token is an ordered set of words (of length m words or less) that appear consecutively within any of the catalogs. In a further embodiment, the token may correspond to an n-gram that appears within one or more terms on which an advertiser bids at a search engine. Thus, in this case, the document collection is the set of all terms on which the advertiser bids at the search engine and a token is an ordered set of words (of length m words or less) that appear consecutively within any of the bidded terms. Thus, if an example bidded term comprises the following string: "Software Engineer with Bachelor Degree", the word "with" is considered a stop word, and the integer m is set to 3, then the tokens derived from this bidded term can be as follows: "software," "engineer," "bachelor," "degree," "software engineer," "engineer bachelor," "bachelor degree," "software engineer bachelor," and "engineer bachelor degree".

In block 106, the process counts the number of times each token appears in a pre-selected portion of the collection of documents. In one embodiment, only tokens whose total number of occurrences in the pre-selected portion is greater than a predetermined threshold "T" are retained. To further restrict the list of identified tokens and eliminate spurious noise, only the tokens that appear in a pre-defined list of tokens are retained, block 108. In one embodiment, the pre-defined list of tokens is derived from query logs issued to a search engine. In another embodiment, the pre-defined list of tokens is manually identified by an expert in the field of interest. All of the tokens that have been observed in the pre-selected portion with a frequency greater than the predetermined threshold "T" and that are also in the list of pre-defined list of tokens constitute a vocabulary.

For each token in the vocabulary, its corresponding inverse document frequency is computed, block 110. In one embodiment, the inverse document frequency of a token is given by the inverse of the total number of documents in the pre-selected portion that contain the token. In an alternative embodiment, the inverse document frequency of a token is given by the logarithm of the inverse of the total number of documents in the pre-selected portion that contain the token. In block 112, the process orders the elements of the vocabulary using an ordering scheme performed on the one or more words comprising each token. In one embodiment, the ordering scheme lexically orders two tokens by the first letter of the first word in each token, then the second letter of the first word if the first letter of the two tokens is the same, and so on. The process then associates each element of the ordered vocabulary with an integer representing its position in the ordered list. For example, the first token will be associated with "1", the second token with "2", and so on. In block 114, the one or more words (keyword) whose representation is desired are issued as a query to a search engine. In response to the query, the search engine returns information about the documents that match the one or more query terms. In general the information returned by the search engine can include one or more of the document title, a summary/abstract, the body of the document, anchor text to the document, and possibly document location. Those skilled in the art will recognize that the content retrieved from the search engine in response to the query (hereafter the "retrieved content") may comprise some or all of the query and the document title, a summary/abstract, the body of the document, anchor text to the document, and document location for a specified number N of the top-ranked documents returned by the search engine.

The retrieved content is parsed using the vocabulary tokens to obtain the token frequency, block 116. The parsing process comprises identifying all tokens in the vocabulary that are contained in the retrieved content; and for each identified token, counting the number of times it appears in the retrieved content. This number represents the token frequency.

In block 118, the process represents the keyword by a vector, wherein the length of the vector is equal to the total number of tokens in the vocabulary. In one embodiment, for each token in the vocabulary, this process comprises the steps of determining if the token does not occur in the results of parsing the returned list, and setting its corresponding entry into the vector to "0." In the case where a token occurs in the results of parsing the returned list, its corresponding entry is set to the product of the token's token frequency and its inverse document frequency. In an alternative embodiment, if the token occurs in the results of parsing the returned list, its corresponding entry is set to the logarithm of the product of the token's token frequency and its inverse document frequency.

Figure 2:
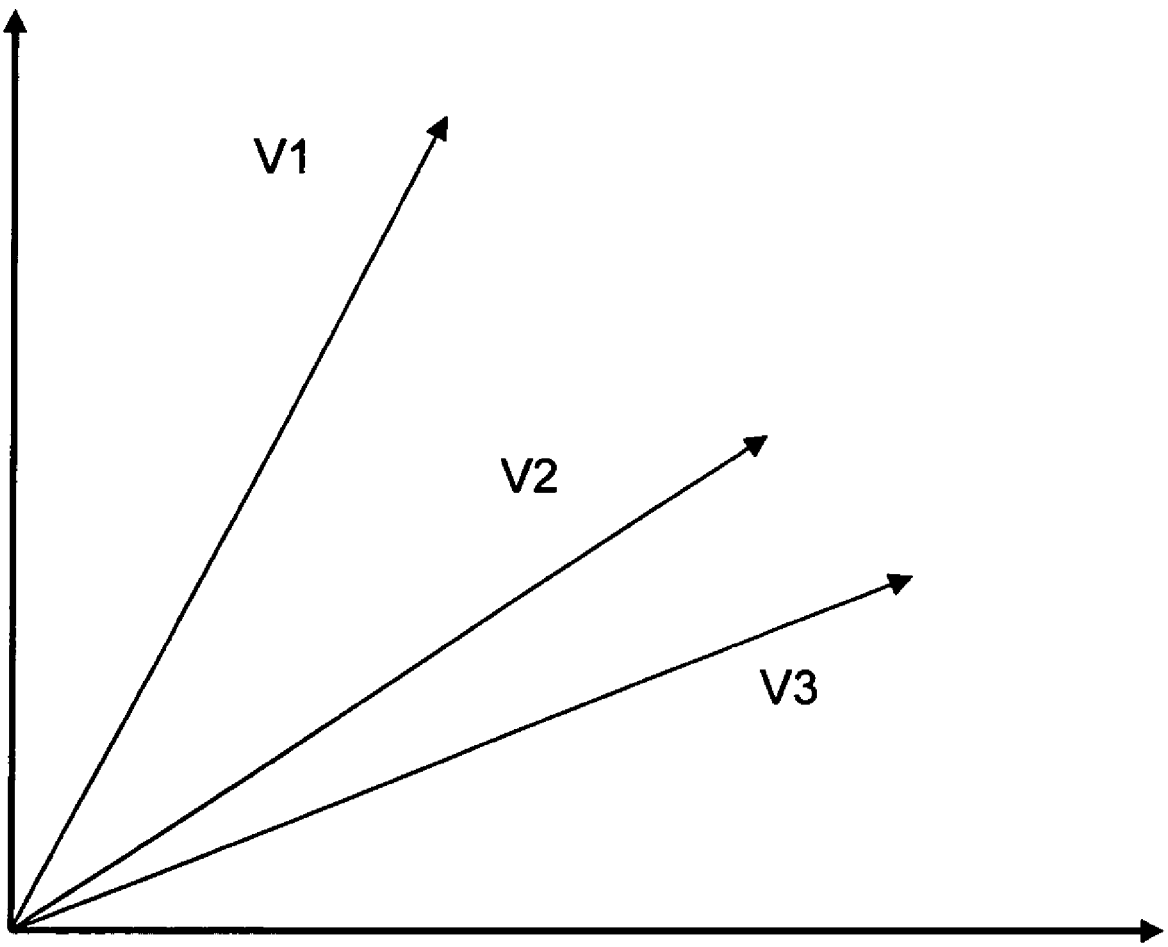
FIG. 2 illustrates the generation of example keyword vectors, according to an embodiment.

As illustrated in the method of FIG. 1, each keyword is represented by a vector, which has a magnitude and direction. Thus, the keywords are described along one or more dimensions (corresponding to the tokens), which admit comparison among them in various ways. FIG. 2 illustrates the distribution of example keyword vectors, according to an embodiment in which there are two tokens. Three separate vectors, $V_1$, $V_2$, and $V_3$ are shown, which correspond to the vectors for keywords 1, 2, and 3, respectively. The vectors for each keyword are compared with one another through one or more methods including cosine product, Hellinger distance, and the Kullback-Leibler distance. The vectors may be normalized so that their relative magnitudes are uniform.

Vector and Taxonomy-Based Categorization

The use of vectors to characterize keywords, such as in the process described with reference to FIG. 1, greatly enhances the ability to identify and return relevant or focused documents within an entire collection of documents.

In one embodiment, keywords are mapped to a taxonomy based universe. The taxonomy is a multi-layered, hierarchical organization of data that is manually built by one or more experts in the field of interest. In one embodiment, the taxonomy comprises a number of nodes (e.g., N=100 nodes), $n_1$ to $n_N$, arranged into a hierarchy.

Figure 3:
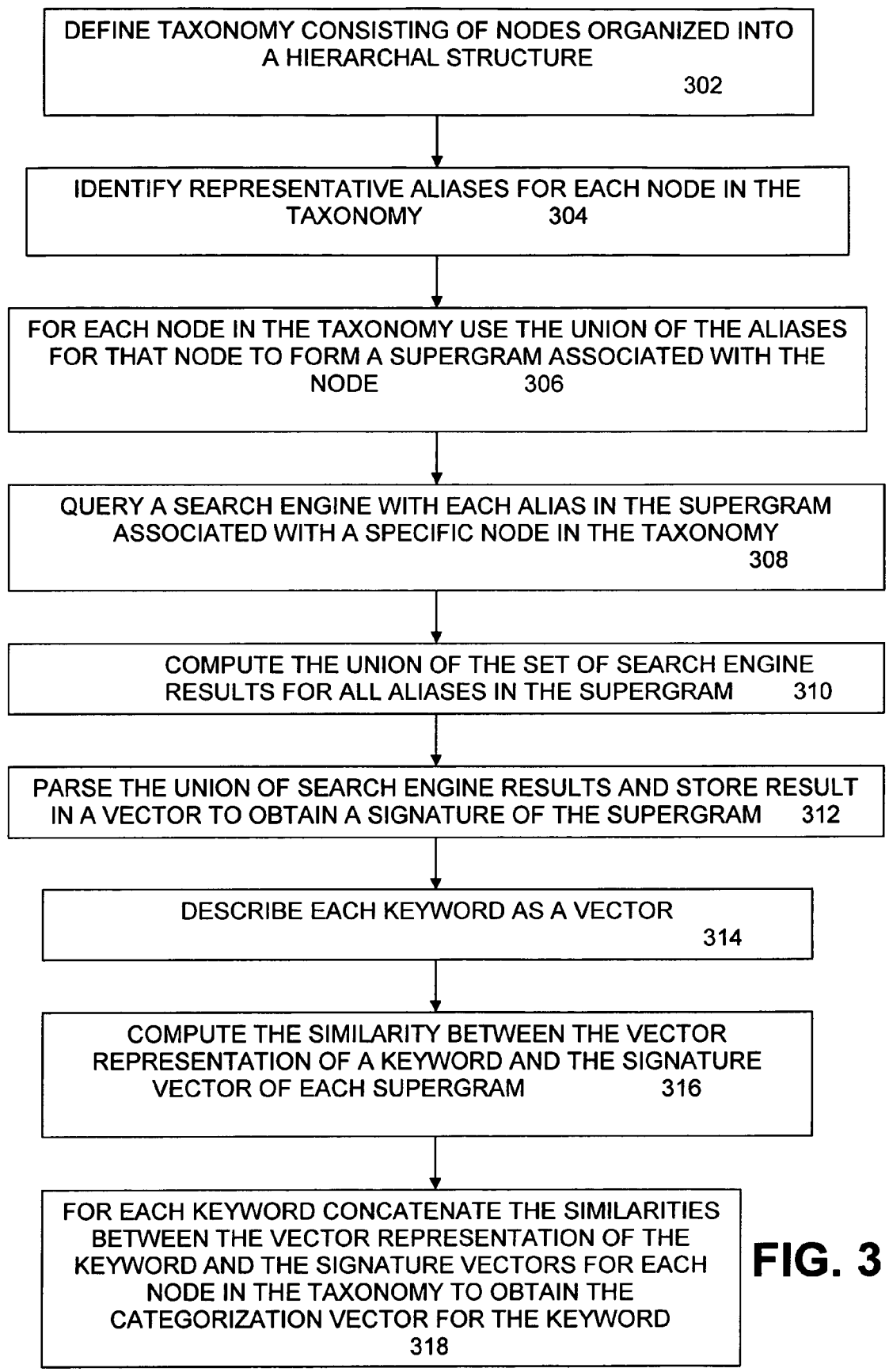
FIG. 3 is a flowchart that illustrates a method of categorizing keywords to nodes of a taxonomy, under an embodiment.
Figure 4:
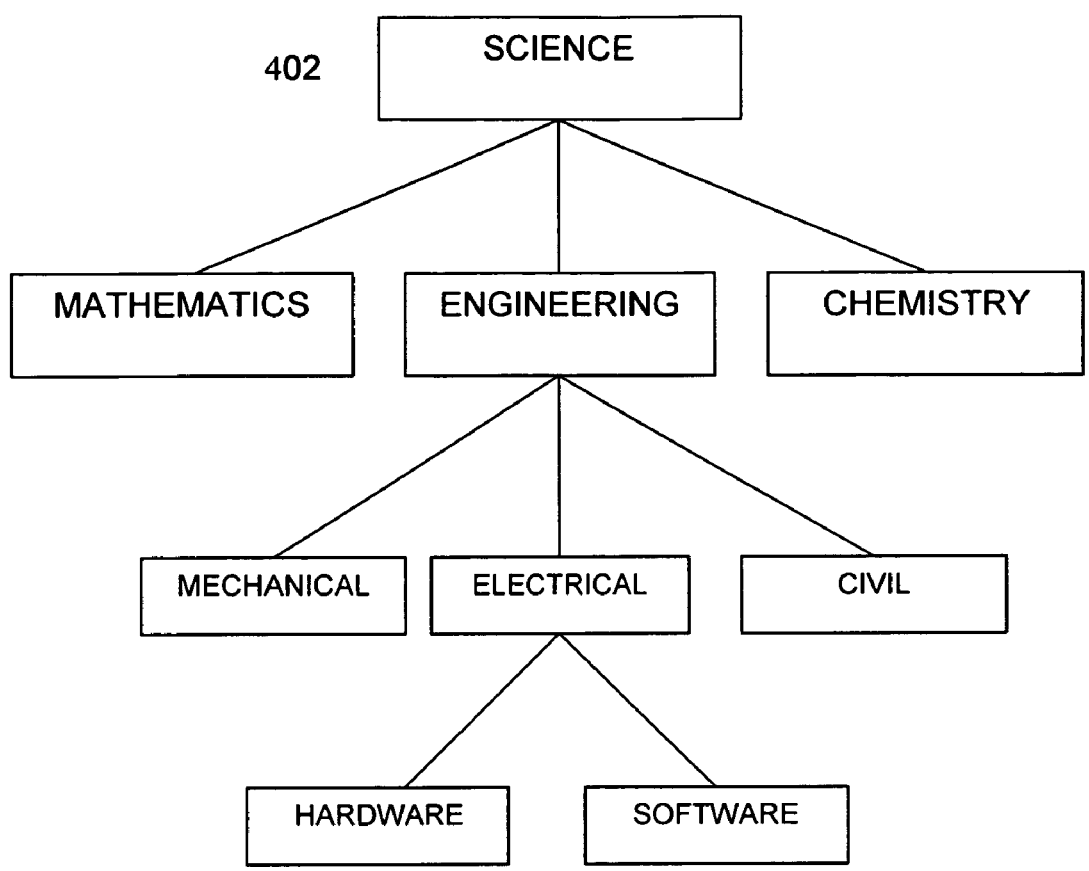
FIG. 4 illustrates a subject matter taxonomy for an example of content used in a content serving process, under an embodiment.

FIG. 3 is a flowchart that illustrates a generalized method of obtaining vector representations of keywords from a collection of documents together with a taxonomy, under an embodiment. In block 302, the process defines the taxonomy into which keywords will be categorized. FIG. 4 illustrates a subject matter taxonomy for an example of content used in a content serving process, under an embodiment. For the example of FIG. 4, which may be for a job ad website, a number of nodes 402 are provided for an advertiser in the field of jobs that can be searched by users. Each node contains links to ads or ad groups related to the actual subject represented for a job search web site. A query in a search engine on the job ad website regarding these subjects results the serving of ads or messages directed to the subject. In taxonomy 400, a number of nodes are available in hierarchy for jobs in the science field. Thus, a number of ads related to particular types of electrical engineering are available in certain nodes derived within the taxonomy from science to engineering.

With reference to FIG. 3, once the taxonomy has been defined in block 302, the process identifies representative aliases for each node in the taxonomy, block 304. An alias is a keyword that is descriptive of the node it represents. In block 306, the process uses the union of the aliases to form a "supergram" associated with the node in the taxonomy. The process then queries the search engine with each alias in the supergram associated with a specific node in the taxonomy, block 308. The union of the set of search engine results for all aliases in the supergram is then computed, block 310. The process then parses the union of search engine results and stores the results into a vector to obtain a "signature" of the supergram, block 312. In one embodiment the signature of the supergram is obtained by parsing the union of the search engine results according to the method illustrated in FIG. 1.

Various heuristics can be employed to improve the signatures. Such heuristics include selecting longer rather than shorter responses (as measured by the length of each element in the responses), selecting more focused results based on how informative the signature are regarding the node, and so on. The search engine results for each node are retrieved and the most informative strings at each node are added to the list of exemplars of that node. In one embodiment, the most informative strings for a node are the most commonly occurring strings in the search engine results for that node. In another embodiment, the most informative strings for a node are the strings that are specific to the node, that is, have a high probability of occurring in the search results of that node and have a low probability of occurring in the search results of other nodes. The criteria of specificity can be captured by the entropy. The probability of observing each string in the search results of each node is computed. For example, the probability of the string "circuit" under the node "electrical engineering" is "0.9" and under the node "mechanical engineering" is "0.1." The entropy computed from the above distribution of probabilities will show that the string "circuit" is very informative about "electrical engineering." In another example, the probability of the string "design" under the node "electrical engineering" is "0.5" and under the node "mechanical engineering" is "0.5." The entropy computed from the above distribution of probabilities will show that the string "design" is not informative about "electrical engineering."

In one embodiment, exemplars are added to the node aliases. Exemplars are strings that best represent the node, and serve to enrich the node vectors. For example, strings such as "circuit," "electronic designs," and "semiconductors" represent the node "electrical engineering." In one embodiment, a set of seed exemplars are first manually selected for each node. To expand the set of exemplars, the seed set of exemplars for each node is issued as queries to a search engine. The search engine results for each node are retrieved and the most informative strings at each node are added to the list of exemplars of that node. In one embodiment, the most informative strings for a node are the most commonly occurring strings in the search engine results for that node. In another embodiment, the most informative strings for a node are the strings that are specific to the node, that is, have a high probability of occurring in the search results of that node and have a low probability of occurring in the search results of other nodes. The criteria of specificity can be captured by the entropy, as described above.

Each keyword is described as a vector, block 314. In one embodiment, the method for describing a keyword as a vector is that illustrated in FIG. 1. The process uses this vector in block 316 to compute the similarity between the vector representation of a keyword and the signature vector of each supergram. For each keyword, the process concatenates the similarities between the vector representation of the keyword and the signature vectors for each node in the taxonomy to obtain the categorization vector for the keyword, block 318.

Vector and Dimension-Based Categorization

Figure 5:
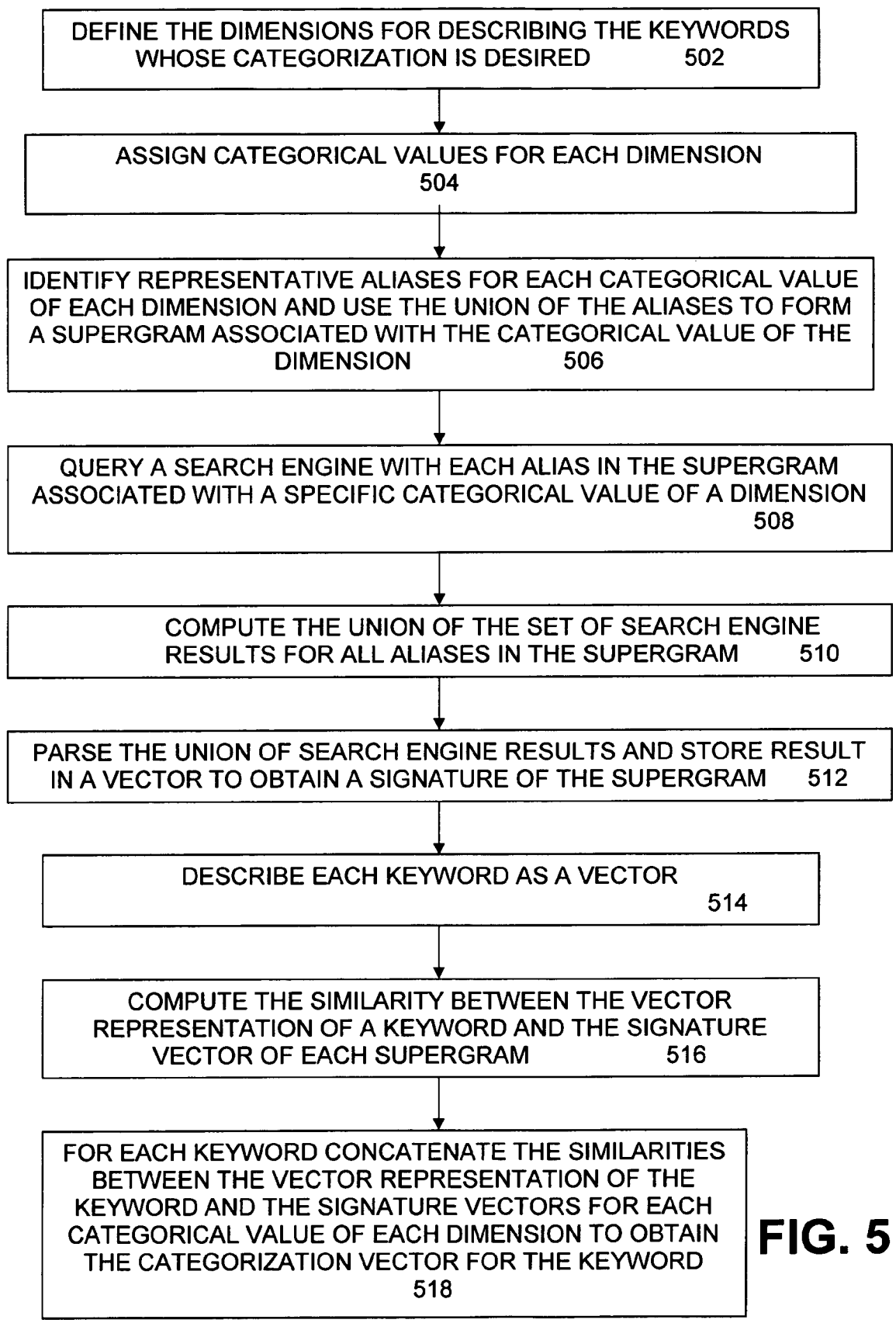
FIG. 5 is a flowchart that illustrates a method of describing keywords along one or more dimensions, under an embodiment.

FIG. 5 is a flowchart that illustrates a method of describing keywords along one or more dimensions, under an embodiment. In block 502, the process defines the dimensions for describing the keywords whose categorization is desired. In some embodiments, the dimensions for describing the keyword are domain specific. In one such embodiment, in which it is desired to categorize keywords that represent search engine queries the dimensions capture the user's tacit knowledge. For example, one dimension for describing the keyword is the "user's intent," i.e., what is the user's motivation beyond the query: is it to purchase a product, get a review, or find coupons for the product, etc. In addition to the user's intent dimension there is a large number of other dimensions that depend on the specific field of application. Thus, the dimension can be any other type of characteristic associated with the user, such as user's background (i.e., demographic information), product attributes, (e.g., is the user interested in a luxury product or a basic product, and so on), product type of interest to the user, and so on. Once the dimensions have been defined in block 502, categorical values are assigned for each dimension, block 504. For example, the "user's intent" dimension has the categorical values "purchase a product", "get a review" and "find coupons". In general, the process user defines a set of dimensions and a set of categorical values for each dimension.

In block 506, the process identifies representative aliases for each categorical value of each dimension. It then uses the union of the aliases to form a supergram associated with the categorical value of the dimension. The process then queries a search engine with each alias in the supergram associated with a specific categorical value of a dimension, block 508. The union of the set of search engine results for all aliases in the supergram is then computed, block 510. The process then parses the union of search engine results and stores the results into a vector to obtain a signature of the supergram, block 512.

Each keyword is described as a vector, block 514. The process uses this vector in block 516 to compute the similarity between the vector representation of a keyword and the signature vector of each supergram. For each keyword, the process concatenates the similarities between the vector representation of the keyword and the signature vectors for each categorical value of each dimension to obtain the categorization vector for the keyword, block 518.

Figure 6:
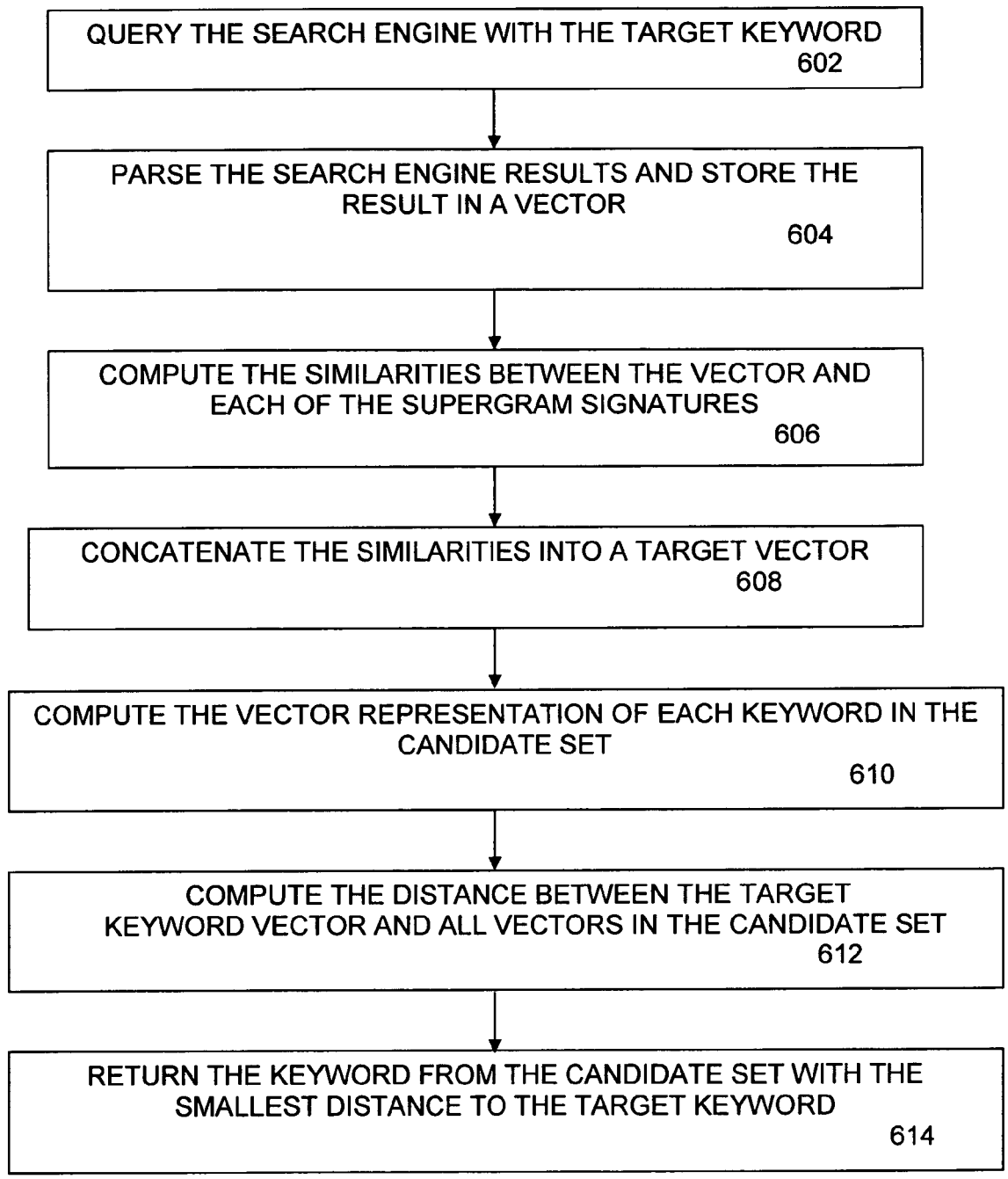
FIG. 6 is a flowchart that illustrates a method of identifying the closest match among a candidate set of keywords to a target keyword, under an embodiment.

FIG. 6 is a flowchart that illustrates a method of obtaining a related keyword from a candidate set of keywords to a target keyword, using either a taxonomy or a set of categorical dimensions, under an embodiment. In block 602, a search engine is queried with the target keyword, and the results are stored. The search engine results are parsed, and the results are stored in a vector, block 604. In one embodiment, the method illustrated in FIG. 1 is used to parse the search engine results. In block 606, the process computes the similarities between this vector and each of the signatures associated with the supergrams, wherein the supergrams are associated either with the nodes in the taxonomy or with the categorical values of the dimensions. The similarities are then concatenated into a target vector, block 608. In one embodiment, the vector representation of a target keyword as computed in block 608 can be used to find the most similar keyword from a candidate set to the target keyword.

In block 610, the process computes the vector representation of each keyword in the candidate set. In one embodiment this computation involves first computing a representation of the candidate keyword using the method illustrated in FIG. 1, then computing the similarities between this vector and each of the signatures associated with the supergrams, and finally, concatenating these similarities into a vector. The distance between the target keyword vector and the all the candidate keyword vectors is then computed using one or more vector distance metrics, such as cosine product, Hellinger distance, and Kullback-Leibler distance, block 612. In block 614, the process returns the keyword from the candidate set with the smallest distance to the target keyword.

Depending upon the implementation, the representation of keywords along different dimensions can be leveraged by machine learning and prediction algorithms to effectively predict performance of new keywords using keywords for which historical performance data has been collected. Thus, in one embodiment, the vector representation can be used as an input to a predictive model to predict the performance of new keywords based on the observed performance of existing keywords. In this embodiment, the vector representation for each of the existing keywords is computed. The process then trains a predictive model with the computed vectors as the input covariates, and the associated observed performance as the output variables. The predictive model can be one or more of linear regression, logistic regression, generalized linear models, and a support vector machine. For this embodiment, the vector representation for each of the new keywords is then computed. These vector representations are used as inputs to the predictive model. The output of the predictive model is then used to predict the performance of the new keywords.

Computer-Based Implementation

Aspects of the one or more embodiments described herein may be implemented on one or more computers or computing devices executing software instructions. The computers may be networked in a client-server arrangement or similar distributed computer network.

Figure 7:
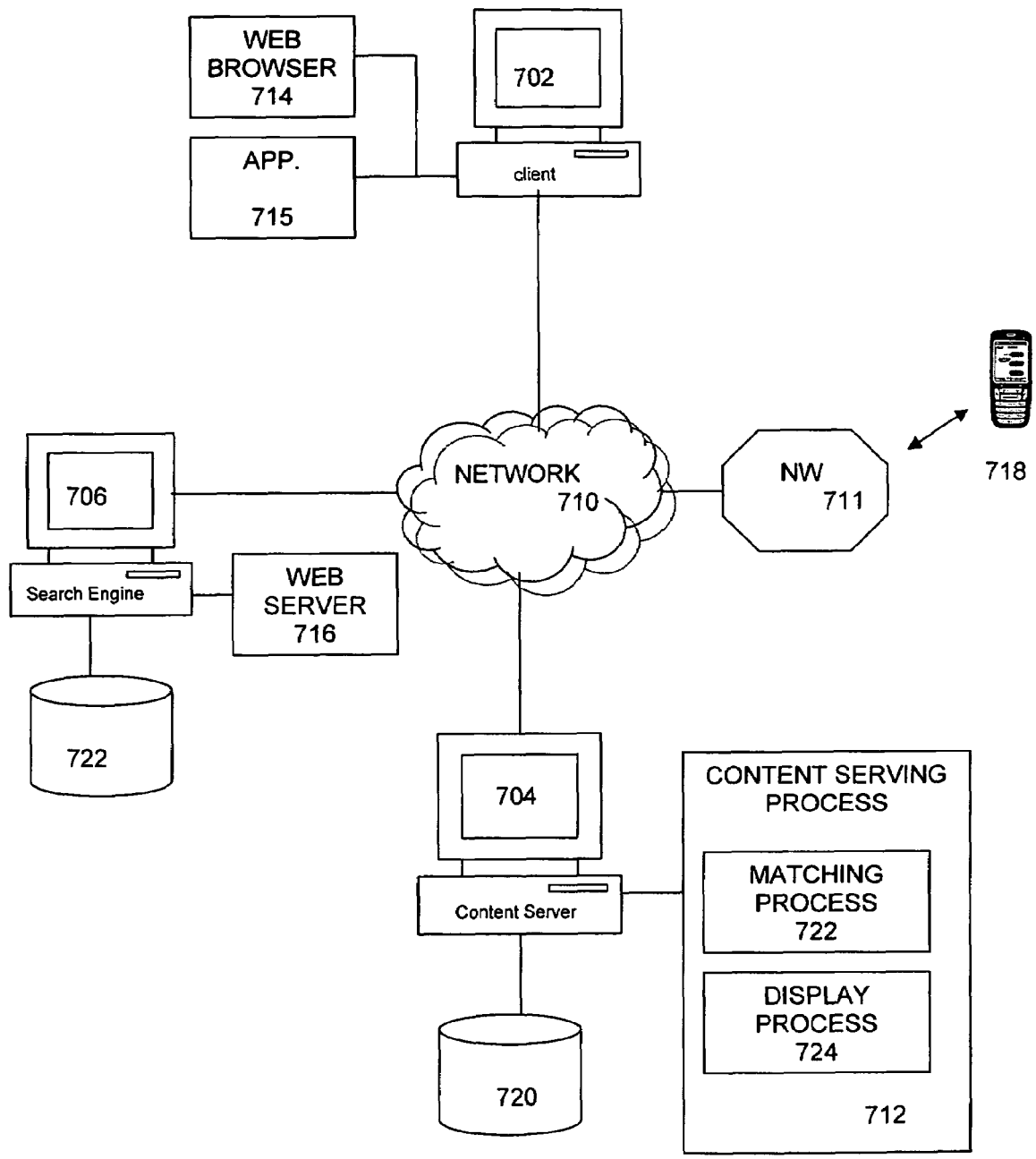
FIG. 7 is a block diagram of a content serving system, according to an embodiment.

FIG. 7 illustrates a computer network system 700 that implements one or more embodiments of a content serving process. In system 700, a network server computer 704 is coupled, directly or indirectly to one or more network client computers 702 through a network 710. The network interface between server computer 704 and client computer 702 may include one or more routers (not shown) that serve to buffer and route the data transmitted between the server and client computers. Network 710 may be the Internet, a Wide Area Network (WAN), a Local Area Network (LAN), or any combination thereof. The client computer can be any class of computing device, such as personal computer, workstation, laptop/notebook computer, personal computing device (PDA), or mobile communication or computing device, such as smartphone 718. The client computers could be coupled to network 710 directly or through intermediate networks, such as cell network 711.

In one embodiment, the client computer is coupled to a server computer 706, which is a World-Wide Web (WWW) server that stores data in the form of web pages and transmits these pages as Hypertext Markup Language (HTML) files over the Internet 710 to the client computer 702, using a web server process 716. For this embodiment, the client computer 702 typically runs a web browser program 714 to access the web pages served by server computer 706 and any other available content provider or supplemental server, such as server 704.

In one embodiment, content server 704 in network system 700 is a server that executes a content or message serving process 712. Client versions of this process 715 may also be executed on the client computer 702. This process 712 may represent one or more executable programs modules that are stored within network server 704 and executed locally within the server. Alternatively, however, it may be stored on a remote storage or processing device coupled to server 704 or network 710 and accessed by server 704 to be locally executed. In a further alternative embodiment, the content serving process 712 may be implemented in a plurality of different program modules, each of which may be executed by two or more distributed server computers coupled to each other, or to network 710 separately.

For an embodiment in which network 710 is the Internet, client computer 702 executes a web browser process 714 that includes one or more search engine programs to access web pages available on a variety of different Internet server sites (web sites) that may provide data or resources to Internet users. System 700 can embody any type of general information system in which content data, such as documents are stored in a data store and are retrieved through requests that do not identify the particular documents specifically, but rather through words or phrases that correspond to words or phrases in or associated with the document.

In one embodiment, server 706 is a search engine server that provides search capabilities to client 702. Server 706 executes web server process 716 to provide search engine home pages to client computer 702 which enables the user to input search terms (query terms) in the form of words or phrases (text strings) related to an item of interest. In response to a user query, the search engine returns information relating to the query and/or a list of other websites that may provide information or resources related to the query. The search engine web page hosted by server 706 includes one or more display areas that allow for the display of search results, as well as any other information or messages. In one embodiment, the search engine web page provides a space for advertising messages to be displayed to the user along with the search result information. The ad messages could be provided by a message server 704, or any other supplemental server coupled to network 710. Data for such ad messages could comprises any type of digital data, such as text, audio, graphic or video data, and may be provided by a data store 720 closely or loosely coupled to the server 704 or any other data server on the network 710. A separate content provider may provide some of the data that is included in the message display process and any advertising or supplemental messages generated or transmitted over system 700.

The content serving process 712 executed by server 704 includes a number of separate programming modules (or components) that serve to find and return appropriate content, such as web pages, advertising or other supplemental messages to the client computer user. Instead of generating and displaying random ads or content, the content serving process 712 finds content that matches the subject matter of the query and provides access to the user, through separate web pages, or similar access devices. A matching process 722 uses information relating to the query and possibly to the search results to find related content stored in the data store 720 or any other appropriate data store. The matching process may select a particular number of data items based on the degree of similarity between the query and the data items and aggregate these items for access by the user. The display process 724 links the content to a "landing page," which displays or further specifies the appropriate locations of the retrieved content (data items) for the user. This method can be used in a number of different applications to improve the matching of retrieved content to specific characteristics or topics of interest for the user. In the case of advertising message serving, this method can provide targeted ad messages that are focused to the user based on a search executed by the user and displayed in an area most likely to be seen by the user, thus increasing the effectiveness of the ad message.

Advertisement Message Serving in Response to a Search Engine Query

In one embodiment, the matching process 722 includes several program components that optimize the comparison of the search query entered by the user to the body of content data available to be accessed so that the most effective content data is found and returned. In many instances, a single query may be a long phrase that potentially includes many ideas. A simple keyword matching technique may identify content that relate somewhat to the query, however, the chances that effective content will be returned for longer search phrases may be minimal.

When the available content data represents available advertising messages, a simple matching technique might look for a match between a query or portion of a query and the title or other identifier associated with an ad, displaying the ad if such a match is found. The ad identifier could be a name of the ad, a keyword in the subject of the ad, or an index or other marker associated with the ad. This method requires an exact match of keywords between the query string (or portion thereof) and the ad marker to result in an advertising message being found and returned in response to a query. In some embodiments, wildcard characters can be used to allow partial matches between the query string and the ad identifier. Thus, for an asterisk * wildcard character, a string such as "engineer*" may return results based on "engineers," "engineering," and so on, instead of "engineer" only. In the case of a document retrieval implementation where the document is in the form of or available as a web page, the matching process compares the ad identifier to a relevant portion of the document, such as URL, title, abstract, body, and so on.

In the context of Internet searching, a search engine typically returns so-called "natural" results that are responsive to the query, as well as "paid" search results, which are provided by an advertiser or similar provider. Present systems use random or non-focused methods to serve the paid search results. Present methods of providing focused advertising for paid results typically utilize rudimentary techniques based on simple keyword matching algorithms. In one embodiment, the natural results of a search are utilized in order to identify and serve the most relevant paid results. In the application of paid search advertising, this method can greatly enhance the efficacy of keyword advertising.

In one embodiment, the matching process includes components that break down the query and the search results and the content data to increase the data pool and provide an intelligent basis for comparison. As described herein, embodiments also include a taxonomy component that categorizes the content data pool by subject matter and specificity and a dimension-based component that categorizes the content data pool along a number of relevant dimensions, in either case with the objective being to further provide intelligent matching capability.

In one embodiment, a number of tokens are used in a process for finding one or more content data items to display in response to a query string entered into the search engine. A vector representation of the query based on the tokens is generated and compared with the corresponding vector representations of a number of data items (such as a message, document, or web page) and the data items with the most similar vector representations to the vector representation of the query are found and displayed on the user computer. Depending upon actual implementation, a number of different methods can be employed to determine the vector representations of the query and the data items, and to determine the similarity between the vector representations.

Figure 8:
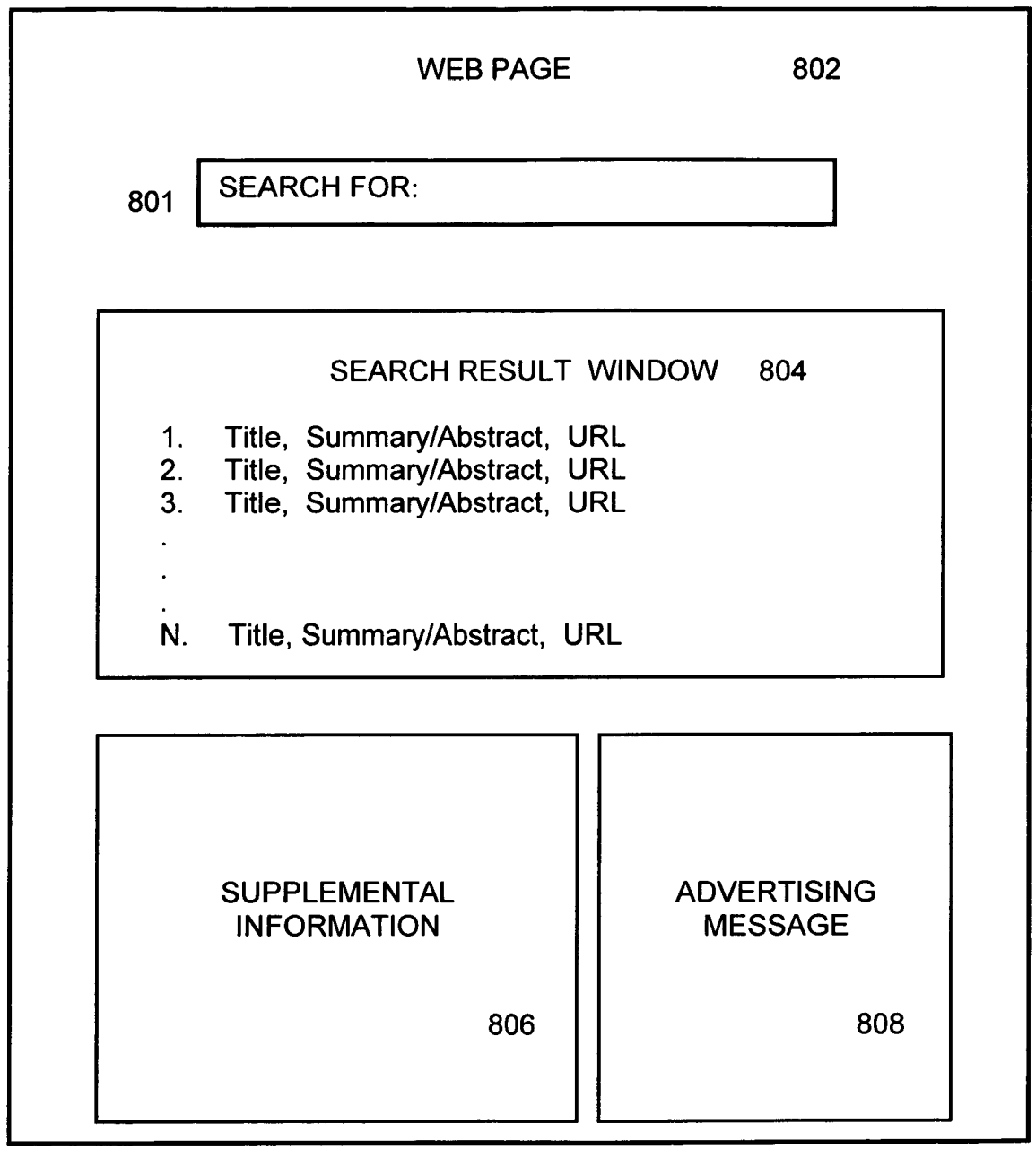
FIG. 8 illustrates an example of a search engine web page for entry of a query utilizing a content serving process, under an embodiment.

FIG. 8 illustrates an example of a search engine web page for entry of a query utilizing a content serving process, under an embodiment. The web page 802 includes a search field 801 that allows the user to input a query. The query could comprise a single word or a phrase. In response to a query input into the search field, the search engine web server 706 returns a number of responses, which are typically links to other web pages or actual data items (e.g., text and/or graphics) related to the query, such as through the words that comprise the query. The query response data or natural search results are displayed in a subwindow 804 of the web page 802. The response data could be any type of data regarding the documents or other data items the search engine deems are related to the query, such as the title, summary/abstract, and URL for a web page or other data item. Any appropriate supplemental information can also be displayed on the web page, such as in subwindow 806. One or more advertising messages or supplemental messages associated with the query response may also be displayed in a web page display area 808. The actual advertising message that is displayed is selected to correspond in some meaningful manner to the query submitted by the user. Thus, the advertisement is directed to the actual user or his or her apparent interests based on the subject matter of the query. The advertising message can be a single message or it could be one of a group of messages, such as in an ad group or supplemental message group.

Figure 9:
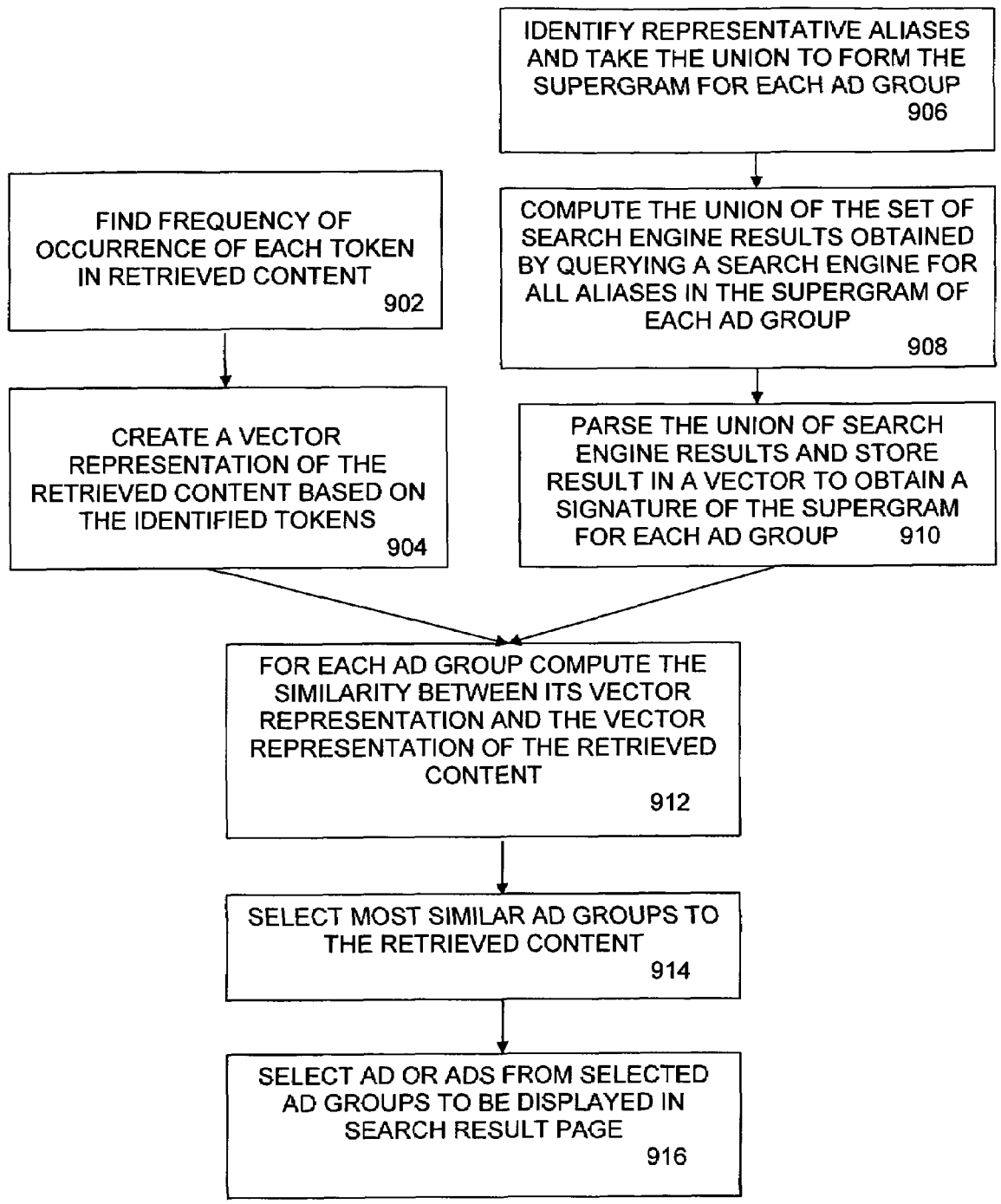
FIG. 9 is a flowchart that illustrates a method of matching query strings and search results to advertising messages, under an embodiment.

FIG. 9 is a flowchart that illustrates a method of determining advertising messages to show in response to a search engine query by employing a method of matching query strings and search results to one or more ad groups by describing ad groups in terms of aliases, supergrams, and signatures, under an embodiment. The embodiment of FIG. 9 illustrates a partial parallel process for retrieving content that comprises both general data items, as well as ad groups, where an ad group is a collection of one or more targeted advertising messages. For this embodiment, the retrieved content comprising the query string and the results of the query string search, or search results, are generally matched to the list of content data or ad groups. In block 902, the process finds the frequency of occurrence of each token in the retrieved content, which may comprise a subset of, or the entire set of the search results. In block 904, the process creates a vector representation of the retrieved content based on the identified tokens.

For the ad group implementation, the process finds representative aliases and takes the union of the aliases for each ad group to form a supergram for each ad group, block 906. In block 908, for each ad group, each alias in the supergram of the ad group is entered as a query to a search engine. The union of all or a portion of the search engine results obtained in response to the queries is formed and, in block 910, is parsed using previously identified tokens to create a vector representation or signature for each ad group. The process then proceeds with block 912 in which, for each ad group or data item, the similarity is computed between its signature and the vector representation of the retrieved content. The most similar ad groups or data items are then selected based on the similarity measure with the retrieved content, block 914. In one embodiment, the most relevant ad groups are selected based at least in part on frequency of occurrence of the aliases corresponding to an ad group in the retrieved content. Ads are then picked from the most relevant ad groups and displayed next to the search results or somewhere appropriate in the web page for the search results that respond to the query, block 916. An ad group may include any number of ads, but this number is typically in the range of one to eight ads. Various methods can be used to select an ad from within an ad group. For example, a rotation scheme can be used for the ads that are to be displayed from the relevant ad groups. Selection logic can be employed to ensure that duplicate ads are not played in the rotation sequence, such as when duplicate ads appear in different ad groups and multiple ads are to be displayed in response to the user query.

In one embodiment, the available advertising messages are mapped to a taxonomy based universe that improves the focus of the search for relevant advertising messages. The taxonomy is a multi-layered, hierarchical organization of data that is manually built by one or more experts. In one embodiment, the taxonomy comprises a number of nodes (e.g., 100 nodes), $n_1$ to $n_N$, based on a hierarchy that corresponds to what the advertisers or message providers offer. For this embodiment, the content serving process 712 includes a taxonomy processing module that maps a query to the most appropriate node or nodes in the taxonomy. For a taxonomy provided by an advertiser, each node is essentially an ad group based on a specific subject matter.

In the context of targeted ad groups, the disclosed methods for finding and retrieving ad messages based on a query becomes a classification and categorization method based on the taxonomy defined by an advertiser. The taxonomy can built by identifying relevant supergrams/nodes using advertiser resources, such as product or service catalogs, or any other relevant information provided by the advertiser. These nodes are then arranged into a number of multi-level hierarchies, such as illustrated in FIG. 4.

Figure 10:
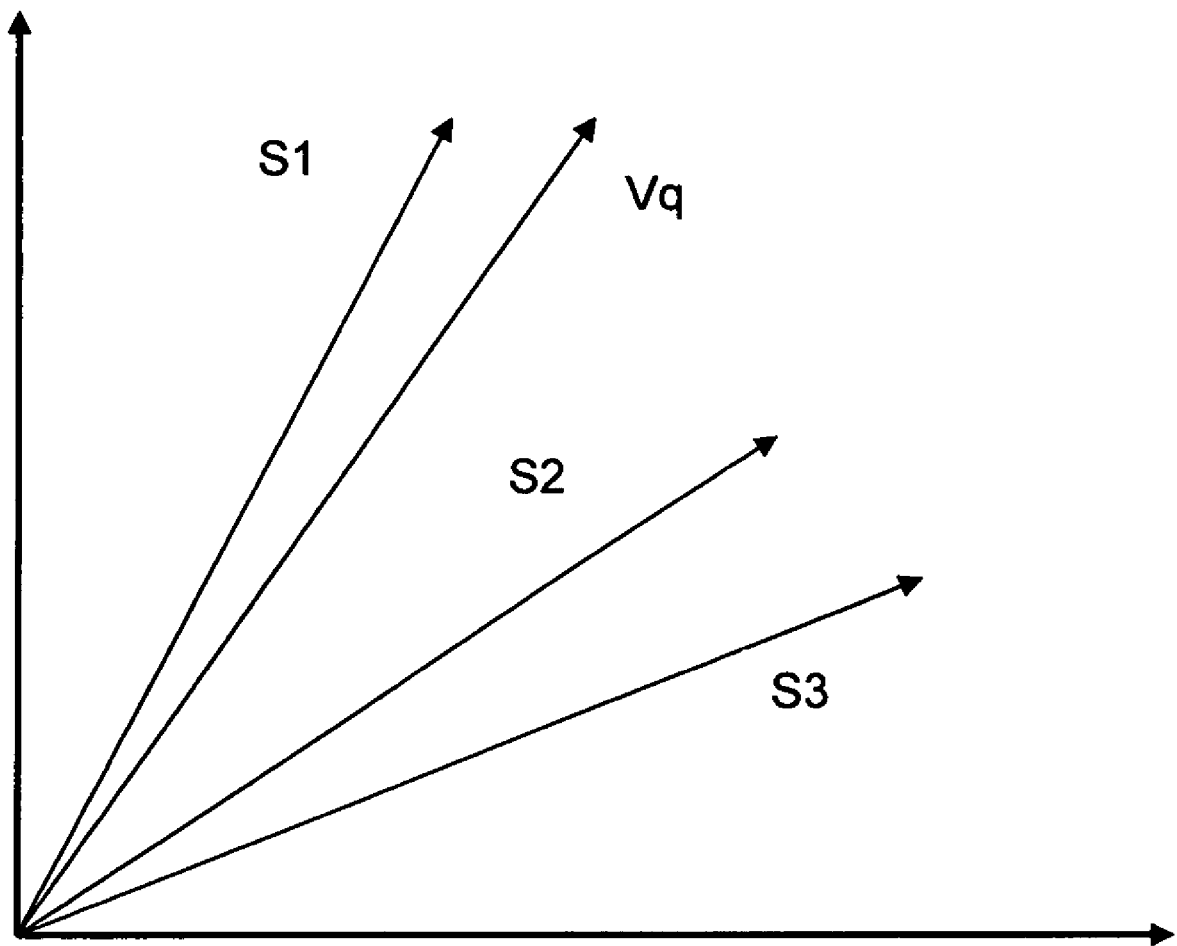
FIG. 10 illustrates the generation of example supergram vectors together with an example query vector, according to an embodiment.

Once the taxonomy is built, the process generates a vector representation for a query. The signatures for each node of the taxonomy are compared with the vector Vq for the query. Whichever node's signature is closest to the query's vector is used to provide the advertising messages. The distances between vectors are determined through a cosine similarity process, or similar process, that measures the relative angle between the various vectors. Thus, for the example of FIG. 10, in which the query vector Vq is compared with the signatures S1, S2, and S3 of nodes 1, 2, and 3, respectively, the query vector is closest to the signature of node 1. Closest vectors may be those that are coincident with one another or that have the smallest included angle between them relative to the other vectors. The vectors may be normalized so that their relative magnitudes are uniform.

It should be noted that although certain described embodiments are directed to the finding and display of advertising messages on a web page, such embodiments are also applicable to locating any other body of content for display on a web page or any displayable screen on a networked computing device. Thus, the described methods are also applicable to associating other relevant content (besides advertisements) to search queries, search results, web pages, or other content.

Content Aggregation

In one embodiment, the content serving process 712 of FIG. 7 creates a web page or landing page that is relevant to the user's intent. The process 712 provides a mechanism to allow the user to access the landing page. The user's intent may be inferred through the access mechanism and/or through earlier actions taken by the user prior to accessing the landing page, such as entering a search query into a search engine. The access mechanism could be a URL link displayed in a banner ad, such as in ad message 808, or as part of the natural search results (such as a URL in window 804), or through other means such as manual URL input to a navigation portion of the web page 802.

In one embodiment, the content serving process uses the query input into the search field 801 as an indicator of the user's intent. The matching process 722 compares the vector representation of the query to the vector representations of a body of content available to the content server. The content could include documents, articles, advertisements, web pages, audio files, video files, or any other content that is related to the user's area of interest, as indicated by the query. The message serving process builds a web page by aggregating all or a portion of all of the relevant content found by the matching process. The matching process compares the vector representation of the query based on previously identified tokens with the corresponding vector representations of the content to determine a measure of similarity between the query and the content. Those content data items with a sufficiently high level of similarity are then used to populate the landing page.

Figure 11:
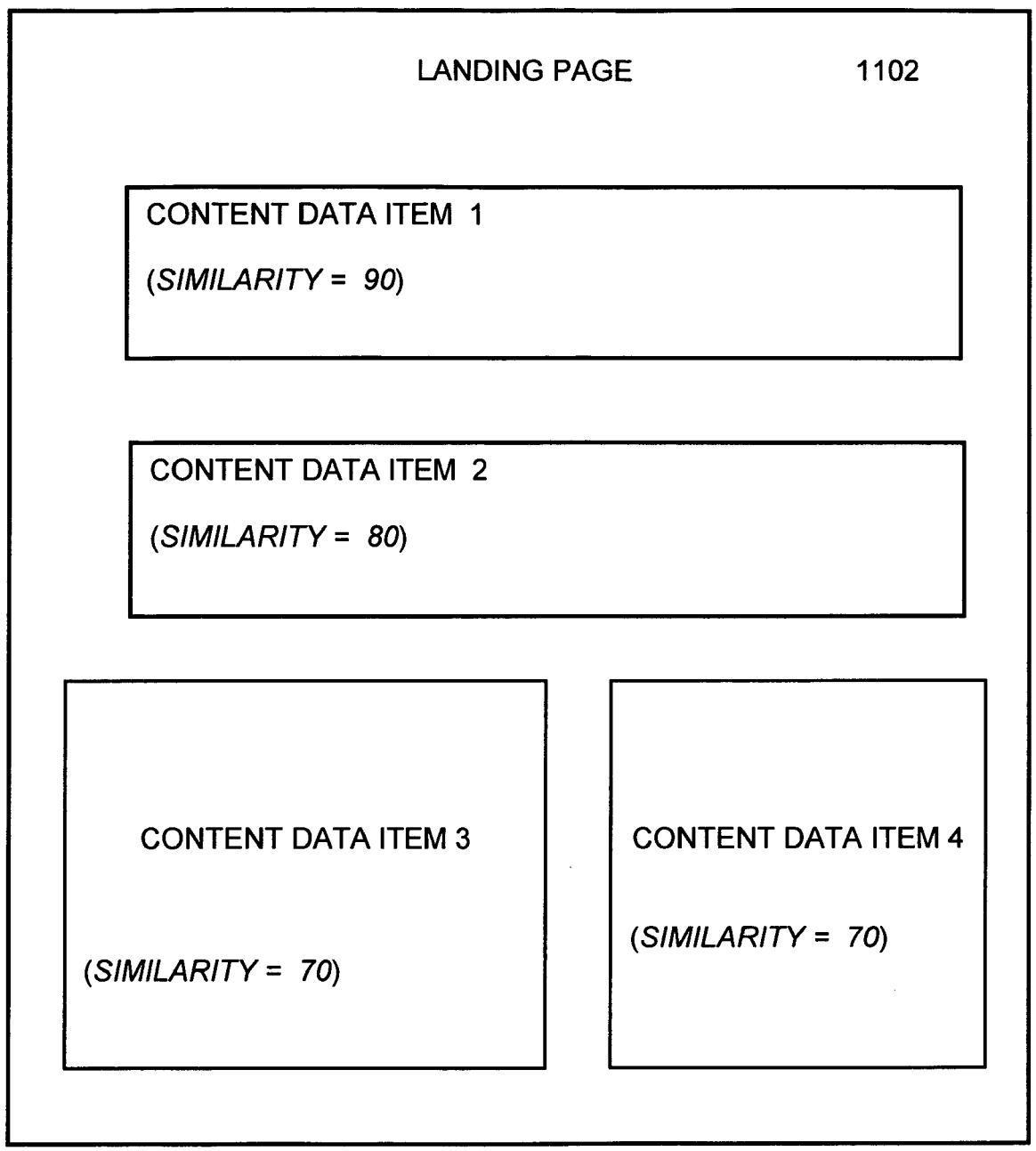
FIG. 11 illustrates a landing page that aggregates a number of content data items identified as being relevant to a user's interests, under an embodiment.

FIG. 11 illustrates a landing page that aggregates a number of content data items retrieved in response to a query, under an embodiment. In landing page 1102, a number of content data items are aggregated and displayed in individual windows or frames of the web page. The number, orientation, size, and so on for these data items can vary depending upon the actual data and implementation. These data items can represent URLs to other pages, text or graphic documents, messages, or any combination thereof. Each content data item has associated with it a similarity measure indicating the degree of similarity of the vector representation of that data item with the vector representation corresponding to the query. Thus, for the example illustrated in FIG. 11, content data item 1 may have a similarity of 90%, while content data item 2 has a similarity of 80%, and content data items 3 and 4 each have a similarity of 70%. Although percentage measures are shown, the similarity measure could be based on any scale. In one embodiment, the similarity measure provides an indication of closeness between the content data item and the subject or topic of interest indicated by the query. The content data items displayed in the landing page may be arranged or ranked in order of similarity or they may be randomly arranged or arranged in any other type of hierarchy.

Aspects of the content serving method described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the content serving method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the content serving method is not intended to be exhaustive or to limit the embodiments to the precise form or instructions disclosed. While specific embodiments of, and examples for, processes in Internet search engines are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the content serving method in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed system and method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A method comprising:

accessing a target comprising a target alphanumerical string that comprises one or more words;

determining one or more tokens from one or more documents, each token comprising a token alphanumerical string that comprises one or more words and appears at least once in the documents;

determining a token order among the tokens;

communicating the target as an original query to a search engine;

accessing one or more original search results returned by the search engine in response to the original query;

calculating an original value for each token based at least in part on a first number of appearances of the token in the documents and a second number of appearances of the token in the original search results;

generating a target vector representing the target, the target vector comprising the original values calculated for the tokens ordered according to the token order;

for each of a plurality of candidates comprising a candidate alphanumerical string that comprises one or more words:

generating a candidate vector representing the candidate; and calculating a distance between the candidate vector and the target vector; and selecting a candidate from the plurality of candidates that is related to the target based on a comparison among the distances between the candidate vectors and the target vector.

2. The method of claim 1, wherein generating a candidate vector representing the candidate comprises:

communicating the candidate as another query to the search engine;

accessing one or more other search results returned by the search engine in response to the other query; and calculating another value for each of the tokens based at least in part on the first number of appearances of the token in the documents and a third number of appearances of the token in the other search results, wherein the candidate vector comprises the other values calculated for the tokens ordered according to the token order.

3. The method of claim 1, wherein determining the one or more tokens from the one or more documents comprises:

parsing each of the documents to obtain potential tokens having a number of words that is less than or equal to a predefined word length;

for each potential token, counting a number of appearances of the token in the documents; and selecting the potential tokens that each has a number of appearances in the documents that is greater than or equal to a predefined threshold.

4. The method of claim 3, wherein determining the one or more tokens from the one or more documents further comprises selecting the potential tokens that belong to a predefined set of tokens.

5. The method of claim 3, wherein determining the one or more tokens from the one or more documents further comprises removing stop words from the documents before parsing the documents to obtain potential tokens.

6. The method of claim 3, wherein:
the one or more documents comprises one or more logs of queries to the search engine or one or more other search engines; and
determining the one or more tokens from the one or more documents further comprises parsing the logs of queries to select one or more sets of words that appear consecutively within a query in the logs of queries, wherein each set of words is less than or equal to the predefined word length.

7. The method of claim 1, wherein the original value calculated for each token equals a product of the token's inverse document frequency within the documents and the second number of appearances of the token in the original search results.

8. The method of claim 1, wherein the original value calculated for each token equals a logarithm of a product of the token's inverse document frequency within the documents and the second number of appearances of the token in the original search results.

9. The method of claim 1, wherein the distance between the target vector and the candidate vector is calculated using a cosine product, a Hellinger distance, or a Kullback-Leibler distance.

10. The method of claim 1, wherein the target is a search query communicated to the search engine by an Internet user and each of the plurality of candidates is an advertising message represented by an advertising message vector.

11. The method of claim 10, further comprising displaying the original search results with one or more advertising messages selected based on a comparison among the distances between the advertising message vectors and the target vector.

12. A method comprising:
accessing a taxonomy comprising one or more nodes arranged in a hierarchy, each node comprising one or more aliases and each alias comprising an alias alphanumerical string that comprises one or more words;
for each of the nodes, generating a node signature vector representing the node;
accessing a target comprising a target alphanumerical string that comprises one or more words;
generating a target vector representing the target;
mapping the target onto the taxonomy to generate a target categorization vector for the target;
accessing a plurality of candidates, each candidate comprising a candidate alphanumerical string that comprises one or more words;
for each of the plurality of candidates:
generating a candidate vector representing the candidate;
mapping the candidate onto the taxonomy to generate a candidate categorization vector for the candidate; and
calculating a distance between the candidate categorization vector and the target categorization vector; and selecting a candidate from the plurality of candidates that is related to the target based on a comparison among the distances between the candidate categorization vectors and the target categorization vector.

13. The method of claim 12, further comprising:
determining one or more tokens from one or more documents, each token comprising a token alphanumerical string that comprises one or more words and appears at least once in the documents; and
determining a token order among the tokens.

14. The method of claim 13, wherein generating a node signature vector that represents a node of the taxonomy comprises:
for each of the aliases of the node, generating an alias vector representing the alias; and
combining the alias vectors to obtain the node signature vector.

15. The method of claim 14, wherein generating an alias vector representing an alias of a node of the taxonomy comprises:
communicating the alias as a query to a search engine;
accessing one or more search results returned by the search engine in response to the query; and
calculating a value for each of the tokens based at least in part on a first number of appearances of the token in the documents and a second number of appearances of the token in the search results, wherein the alias vector comprises the values calculated for the tokens ordered according to the token order.

16. The method of claim 14, wherein combining the alias vectors representing the aliases of the node comprises:
summing the alias vectors; and
normalizing the sum of the alias vectors to obtain the node signature vector.

17. The method of claim 13, wherein generating the target vector representing the target comprises:
communicating the target as a query to a search engine;
accessing one or more original search results returned by the search engine in response to the query; and
calculating a value for each of the tokens based at least in part on a first number of appearances of the token in the documents and a second number of appearances of the token in the original search results, wherein the target vector comprises the values calculated for the tokens ordered according to the token order.

18. The method of claim 17, wherein mapping the target onto the taxonomy to generate the target categorization vector comprises:
determining a node order among the nodes of the taxonomy; and
for each of the nodes in the taxonomy, calculating a distance between the target vector representing the target and the node signature vector representing the node, wherein the target categorization vector comprises the distances calculated for the nodes of the taxonomy ordered according to the node order.

19. The method of claim 18, wherein generating the candidate vector representing a candidate among the plurality of candidates comprises:
communicating the candidate as a query to the search engine;
accessing one or more other search results returned by the search engine in response to the query; and
calculating a value for each of the tokens based at least in part on a third number of appearances of the token in the documents and a fourth number of appearances of the token in the other search results, wherein the candidate vector comprises the values calculated for the tokens ordered according to the token order.

20. The method of claim 19, wherein:

mapping a candidate from the plurality of candidates onto the taxonomy to generate a candidate categorization vector comprises for each of the nodes in the taxonomy, calculating a distance between the candidate vector representing the candidate and the node signature vector representing the node; and the candidate categorization vector comprises the distances calculated for the nodes of the taxonomy ordered according to the node order.

21. The method of claim 12, wherein the target is a search query communicated to a search engine by an Internet user and each of the plurality of candidates is an advertising message with a corresponding advertising message categorization vector.

22. The method of claim 21, further comprising displaying the original search results with one or more advertising messages selected based on a comparison among the distances between the advertising message categorization vectors and the target categorization vector.

23. The method of claim 12, wherein an alias of a node of the taxonomy describes an aspect of the node and has been identified using one or more of entropy, mutual information, or most commonly occurring.

24. A method comprising:

accessing one or more categories, each category comprising one or more aliases and each alias comprising an alias alphanumerical string that comprises one or more words;

for each of the categories, generating a category signature vector representing the category;

accessing a target comprising a target alphanumerical string that comprises one or more words;

generating a target vector representing the target;

mapping the target onto the categories to generate a target categorization vector for the target;

accessing a plurality of candidates, each candidate comprising a candidate alphanumerical string that comprises one or more words;

for each of the plurality of candidates:
generating a candidate vector representing the candidate;
mapping the candidate onto the categories to generate a candidate categorization vector for the candidate; and
calculating a distance between the candidate categorization vector and the target categorization vector; and selecting a candidate from the plurality of candidates that is related to the target based on a comparison among the distances between the candidate categorization vectors and the target categorization vector.

25. The method of claim 24, wherein one or more different groups each corresponds to a different aspect of Internet users and selected ones of the categories belong to a same one of the groups.

26. The method of claim 24, further comprising:

determining one or more tokens from one or more documents, each token comprising a token alphanumerical string that comprises one or more words and appears at least once in the documents; and determining a token order among the tokens.

27. The method of claim 26, wherein generating a category signature vector that represents a category comprises:

for each of the aliases of the category, generating an alias vector representing the alias; and combining the alias vectors to obtain the category signature vector.

28. The method of claim 27, wherein generating an alias vector representing an alias of a category comprises:

communicating the alias as a query to a search engine;

accessing one or more search results returned by the search engine in response to the query; and calculating a value for each of the tokens based at least in part on a first number of appearances of the token in the documents and a second number of appearances of the token in the search results, wherein the alias vector comprises the values calculated for the tokens ordered according to the token order.

29. The method of claim 27, wherein combining the alias vectors representing the aliases of the category comprises:

summing the alias vectors; and normalizing the sum of the alias vectors to obtain the category signature vector.

30. The method of claim 26, wherein generating the target vector representing the target comprises:

communicating the target as a query to a search engine;

accessing one or more original search results returned by the search engine in response to the query; and calculating a value for each of the tokens based at least in part on a first number of appearances of the token in the documents and a second number of appearances of the token in the original search results, wherein the target vector comprises the values calculated for the tokens ordered according to the token order.

31. The method of claim 30, wherein mapping the target onto the categories to generate the target categorization vector comprises:

determining a category order among the categories; and for each of the categories, calculating a distance between the target vector representing the target and the category signature vector representing the category, wherein the target categorization vector comprises the distances calculated for the categories ordered according to the category order.

32. The method of claim 31, wherein generating the candidate vector representing a candidate among the plurality of candidates comprises:

communicating the candidate as a query to the search engine;

accessing one or more other search results returned by the search engine in response to the query; and calculating a value for each of the tokens based at least in part on a third number of appearances of the token in the documents and a fourth number of appearances of the token in the other search results, wherein the candidate vector comprises the values calculated for the tokens ordered according to the token order.

33. The method of claim 32, wherein mapping a candidate from the plurality of candidates onto the categories to generate a candidate categorization vector comprises:

for each of the categories, calculating a distance between the candidate vector representing the candidate and the category signature vector representing the category, wherein the candidate categorization vector comprises the distances calculated for the categories ordered according to the category order.

34. The method of claim 24, wherein the target is a search query communicated to a search engine by an Internet user and each of the plurality of candidates is an advertising message with a corresponding advertising message categorization vector.

35. The method of claim 34, further comprising displaying the original search results with one or more advertising messages selected based on a comparison among the distances between the advertising message categorization vectors and the target categorization vector.

36. The method of claim 24, wherein an alias of a category describes an aspect of the category and has been identified using one or more of entropy, mutual information, or most commonly occurring.

* * * * *